(12) United States Patent
Nguyen et al.

(10) Patent No.: US 8,873,557 B2
(45) Date of Patent: Oct. 28, 2014

(54) SYSTEMS AND METHODS FOR PACKET DE-DUPLICATION

(75) Inventors: Hung Nguyen, San Jose, CA (US);
Sandeep Dahiya, San Jose, CA (US);
Murali Bommana, Fremont, CA (US)

(73) Assignee: Gigamon Inc., Milpitas, CA (US)

( * ) Notice: Subject to any disclaimer, the term of this patent is extended or adjusted under 35 U.S.C. 154(b) by 452 days.

(21) Appl. No.: 13/083,410

(22) Filed: Apr. 8, 2011

(65) Prior Publication Data

US 2012/0257627 A1    Oct. 11, 2012

(51) Int. Cl.
| | |
|---|---|
| *H04L 12/28* | (2006.01) |
| *H04L 12/56* | (2006.01) |
| *H04L 12/939* | (2013.01) |
| *H04L 12/931* | (2013.01) |
| *H04L 29/06* | (2006.01) |

(52) U.S. Cl.
CPC ........... *H04L 49/552* (2013.01); *H04L 63/0236* (2013.01); *H04L 49/208* (2013.01)
USPC ........................................................ 370/392

(58) Field of Classification Search
None
See application file for complete search history.

(56) References Cited

U.S. PATENT DOCUMENTS

| | | | |
|---|---|---|---|
| 5,864,478 A | 1/1999 | McCutchan | |
| 6,760,303 B1 | 7/2004 | Brouwer | |
| 7,099,281 B1 | 8/2006 | Conway | |
| 7,376,132 B2 | 5/2008 | Conway | |
| 7,424,018 B2 | 9/2008 | Gallatin | |
| 7,436,832 B2 | 10/2008 | Gallatin | |
| 7,440,467 B2 | 10/2008 | Gallatin | |
| 7,593,351 B1 | 9/2009 | Zioulas | |
| 7,603,474 B2 * | 10/2009 | Stern | 709/232 |
| 7,646,715 B2 * | 1/2010 | Oueslati et al. | 370/234 |
| 7,685,097 B2 * | 3/2010 | St. John et al. | 707/748 |
| 7,729,240 B1 | 6/2010 | Crane et al. | |
| 7,751,406 B2 * | 7/2010 | Shrum et al. | 370/395.21 |
| 7,792,047 B2 | 9/2010 | Gallatin | |
| 7,835,358 B2 * | 11/2010 | Gallatin et al. | 370/390 |
| 7,936,678 B2 * | 5/2011 | Paloheimo et al. | 370/235 |
| 8,089,869 B2 * | 1/2012 | Kisela et al. | 370/229 |
| 8,091,007 B2 * | 1/2012 | Winter | 714/758 |
| 8,238,288 B2 * | 8/2012 | Ahn | 370/328 |
| 8,315,256 B2 * | 11/2012 | Leong et al. | 370/389 |
| 8,451,817 B2 * | 5/2013 | Cheriton | 370/349 |
| 2004/0213265 A1 | 10/2004 | Oueslati et al. | |
| 2005/0018668 A1 | 1/2005 | Cheriton | |

(Continued)

OTHER PUBLICATIONS

Non-Final Office Action dated Jan. 31, 2012 for U.S. Appl. No. 12/712,093.

(Continued)

*Primary Examiner* — Ayaz Sheikh
*Assistant Examiner* — Blanche Wong
(74) *Attorney, Agent, or Firm* — Vista IP Law Group, LLP

(57) ABSTRACT

A method of packet processing includes receiving a first packet that includes a header, the header having a plurality of fields, one of the plurality of fields being an identification field, determining an identification value for the identification field in the header of the first packet, determining whether the identification value of the first packet matches an identification value in a header of a second packet, and using another one of the fields in the header of the first packet to determine whether the first packet is a duplicate packet when the identification value of the first packet matches the identification value of the second packet.

40 Claims, 10 Drawing Sheets

(56) References Cited

U.S. PATENT DOCUMENTS

| | | |
|---|---|---|
| 2005/0100020 A1 | 5/2005 | Hata et al. |
| 2005/0185587 A1 | 8/2005 | Klinker |
| 2005/0254490 A1 | 11/2005 | Gallatin et al. |
| 2006/0004702 A1 | 1/2006 | St. John et al. |
| 2006/0007936 A1 | 1/2006 | Shrum et al. |
| 2006/0270400 A1 | 11/2006 | DaSilva |
| 2007/0089041 A1 | 4/2007 | Wu |
| 2007/0274275 A1 | 11/2007 | Laroia et al. |
| 2008/0247355 A1 | 10/2008 | Ahn |
| 2009/0073897 A1 | 3/2009 | Winter |
| 2009/0116398 A1 | 5/2009 | Shi et al. |
| 2009/0141626 A1 | 6/2009 | Rogers |
| 2009/0196194 A1 | 8/2009 | Paloheimo et al. |
| 2009/0225676 A1 | 9/2009 | Kisela |
| 2009/0262745 A1 | 10/2009 | Leong |
| 2009/0287843 A1 | 11/2009 | Morimura |
| 2010/0165859 A1 | 7/2010 | Carruzzo et al. |
| 2010/0274857 A1 | 10/2010 | Garza |
| 2011/0058482 A1 | 3/2011 | Nomura et al. |
| 2011/0141924 A1 | 6/2011 | Froehlich |
| 2011/0246645 A1 | 10/2011 | Martin |
| 2012/0224480 A1 | 9/2012 | Nakash |

OTHER PUBLICATIONS

Final Office Action dated Aug. 14, 2012 for U.S. Appl. No. 12/712,093.
J. Touch, "Updated Specification of the IPv4 ID Field draft-touch-intarea-ipv4-unique-id-03.txt", IETF Tools, Mar. 5, 2010.
International Search Report and Written Opinion for corresponding application PCT/US2011/046656, dated Dec. 8, 2011.
Non-Final Office Action dated Nov. 13, 2012 for U.S. Appl. No. 13/083,478.
Advisory Action dated Oct. 25, 2012 for U.S. Appl. No. 12/712,093.
Final Office Action dated Jun. 24, 2013 for U.S. Appl. No. 13/083,478.
Advisory Action dated Sep. 9, 2013 for U.S. Appl. No. 13/083,478.
Non-final Office Action dated Nov. 19, 2013 for U.S. Appl. No. 13/083,478.
Extended European Search Report dated Jul. 10, 2014 for EP Patent Application No. 11863023.5, 5 pages.
Advisory Action dated Aug. 27, 2014 for U.S. Appl. No. 13/083,478.

\* cited by examiner

SYSTEMS AND METHODS FOR PACKET DE-DUPLICATION

RELATED APPLICATION DATA

This application is related to U.S. patent application Ser. No. 12/712,093, filed on Feb. 24, 2010, the entire disclosure is expressly incorporated by reference herein.

FIELD

This application relates generally to network switch devices.

BACKGROUND

Network switches have been used to forward packets from one node to another node. Such network switch devices include a first network port for receiving packets from a first node, and a second network port for passing the packets to a second node.

In a packet-switching network, the transmission, routing, forwarding, and the like of messages between the terminals in the packet-switching network are broken into one or more packets. Typically, data packets transmitted or routed through the packet switching network comprise three elements: a header, a payload, and a trailer. The header may comprise several identifiers such as source and destination terminal addresses, VLAN tag, packet size, packet protocol, and the like. The payload is the core data for delivery, other than header or trailer, which is being transmitted. The trailer typically identifies the end of the packet and may comprise error checking information (e.g., CRC information). Data packets may conform to a number of packet formats such as IEEE 802.1D or 802.3.

Associated with each terminal in the packet-switching network is a unique terminal address. Each of the packets of a message has a source terminal address, a destination terminal address, and a payload, which contains at least a portion of the message. The source terminal address is the terminal address of the source terminal of the packet. The destination terminal address is the terminal address of the destination terminal of the packet. Further, each of the packets of a message may take different paths to the destination terminal, depending on the availability of communication channels, and may arrive at different times. The complete message is reassembled from the packets of the message at the destination terminal. One skilled in the art commonly refers to the source terminal address and the destination terminal address as the source address and the destination address, respectively.

Applicant of the subject application has determined that packet switch devices (appliances) can be used to forward a copy of packets (either obtained through a SPAN port of a switch or router, or by making a copy of each packet through its built-in tap modules) in the packet-switching network, to network monitoring or security tools for analysis thereby. Such packet switch appliances may have one or more network ports for connection to the packet-switching network and one or more instrument ports connected to one or more network instruments for monitoring packet traffic, such as packet sniffers, intrusion detection systems, application monitors, or forensic recorders.

Sometimes, users may wish to deploy various network instruments for monitoring packet traffic. In order to monitor every packet that goes through a switch, a span port is usually set up such that a copy of every packet is made when they pass through the ports, ingress or egress. Therefore, for a packet that enters in one port of the switch and then egresses out of another port of the same switch, at least two copies of this packet are sent out of the span port. If this packet is a multicast packet, then the switch will send out multiple copies of this packet through multiple ports, and hence the span port will send out even more copies of this packet. In this kind of situation, the copies of the packet coming out of the span port are usually identical.

In other situations, the switch may change the VLAN tag of the packet such that within the copies of this packet, some of them may have different VLAN tags. Also, the packet may go through a router, in which case the destination MAC address or even some fields in the IP header information may have been changed, such as the TTL field, but the payload remains the same.

If copies of packets are made at other network devices and forwarded to the same analysis tool, the analysis tool may be receiving packets with the same payload at slightly different times. The generation of duplicate packets can also occur in redundant network segments depending on the location of tapping points within the segments that are used to tap packets to be forwarded to an analysis tool. That is, depending on where taps are located in a redundant network segment, multiple copies of the same packet or multiple copies of packets with the same payload (i.e., packets that only have different destination and/or source address) may be generated. The presence of such duplicate packets can prevent accurate analysis from occurring, can negatively influence available bandwidth in the network, or can overwhelm a tool that does not have the performance to handle all these packets which carry duplicated information. Therefore, Applicant of the subject application determines that it would be desirable to have a new system and method for removing duplicate packets prior to any analysis or monitoring of the packets.

SUMMARY

In accordance with some embodiments, a method of packet processing includes receiving a first packet that includes a header, the header having a plurality of fields, and determining whether the first packet is a duplicate packet using a first one of the plurality of fields according to a pre-determined field-checking hierarchy, wherein the pre-determined field-checking hierarchy prescribes the first one of the plurality of fields to be checked before a second one of the plurality of fields, the first one of the plurality of fields having a relatively higher change rate statistically than the second one of the plurality of fields, and wherein the first packet is determined to be the duplicate packet when the first one of the plurality of fields matches a respective one of fields in a second packet that is received before the first packet, and when the first packet is received within a prescribed time period since the second packet is received.

In accordance with other embodiments, a packet switch system includes a first port configured for receiving a first packet that includes a header, the header having a plurality of fields, and an integrated circuit configured for determining whether the first packet is a duplicate packet using a first one of the plurality of fields according to a pre-determined field-checking hierarchy, wherein the pre-determined field-checking hierarchy prescribes the first one of the plurality of fields to be checked before a second one of the plurality of fields, the first one of the plurality of fields having a relatively higher change rate statistically than the second one of the plurality of fields, and wherein the integrated circuit is configured to determine the first packet as the duplicate packet when the first one of the plurality of fields matches a respective one of fields in a second packet that is received before the first packet, and when the first packet is received within a prescribed time period since the second packet is received.

In accordance with other embodiments, a computer program product includes a non-transitory medium storing a set of instructions, an execution of which causes a method of packet processing to be performed, the method comprising receiving a first packet that includes a header, the header having a plurality of fields, and determining whether the first packet is a duplicate packet using a first one of the plurality of fields according to a pre-determined field-checking hierarchy, wherein the pre-determined field-checking hierarchy prescribes the first one of the plurality of fields to be checked before a second one of the plurality of fields, the first one of the plurality of fields having a relatively higher change rate statistically than the second one of the plurality of fields, and wherein the first packet is determined to be the duplicate packet when the first one of the plurality of fields matches a respective one of fields in a second packet that is received before the first packet, and when the first packet is received within a prescribed time period since the second packet is received.

In accordance with other embodiments, a method of packet processing includes receiving a first packet that includes a header, the header having a plurality of fields, one of the plurality of fields being an identification field, determining an identification value for the identification field in the header of the first packet, determining whether the identification value of the first packet matches an identification value in a header of a second packet, and using another one of the fields in the header of the first packet to determine whether the first packet is a duplicate packet when the identification value of the first packet matches the identification value of the second packet.

In accordance with other embodiments, a packet switch appliance includes a first port configured for receiving a first packet that includes a header, the header having a plurality of fields, one of the plurality of fields being an identification field, and an integrated circuit configured for determining an identification value for the identification field in the header of the first packet, determining whether the identification value of the first packet matches an identification value in a header of a second packet, and using another one of the fields to determine whether the first packet is a duplicate packet when the identification value of the first packet matches the identification value of the second packet.

In accordance with other embodiments, a computer program product has a non-transitory medium storing a set of instructions, an execution of which causes a method of packet processing to be performed, the method comprising receiving a first packet that includes a header, the header having a plurality of fields, one of the plurality of fields being an identification field, determining an identification value for the identification field in the header of the first packet, determining whether the identification value of the first packet matches an identification value in a header of a second packet, and using another one of the fields to determine whether the first packet is a duplicate packet when the identification value of the first packet matches the identification value of the second packet.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
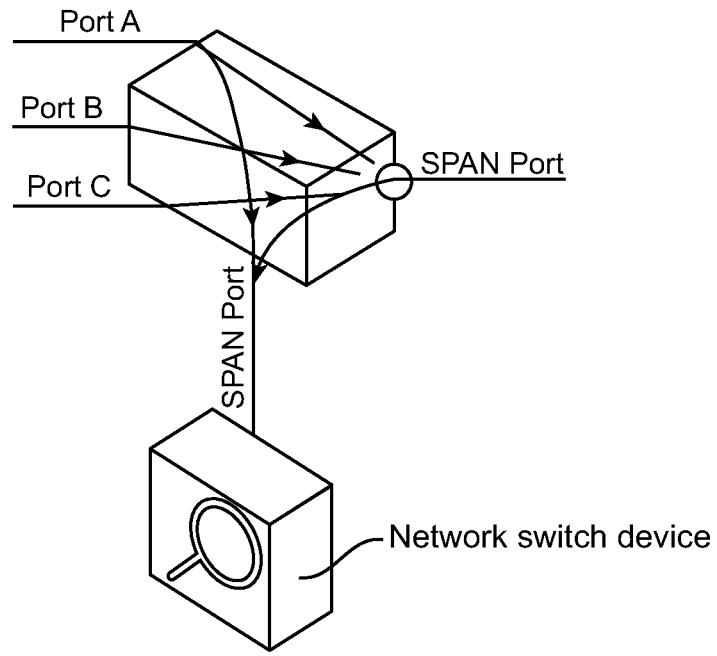
FIG. 1 illustrates an example of how a duplicate packet may be created.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

In a network, duplicate packets may be created in different situations. A packet is considered to be a duplication of another one when they are the exact piece in a particular conversation between two endpoints in a network cloud. The duplicate packet needs not have the same information from head to toes as another packet, but the duplicate packet has at least the same payload as another packet. Thus, as used in this specification, the term "duplicate packet" or similar terms (such as "duplicated packet", "duplication", "copy", etc.) refer to a packet that has at least the same payload as that of another packet. In some cases, the duplicate packet may also have information in one or more fields in a header that is the same as the corresponding one(s) in the header of another packet.

FIG. 1 illustrates an example of how a duplicate packet may be created. In the illustrated example of FIG. 1, packets from port A, B, and C are sent to a WAN port. A SPAN port is configured to tap port A and also mirror all traffic ingress and egress from the WAN port. A packet sent from port A to the WAN port in this case will be copied twice to the SPAN port.

Figure 2:
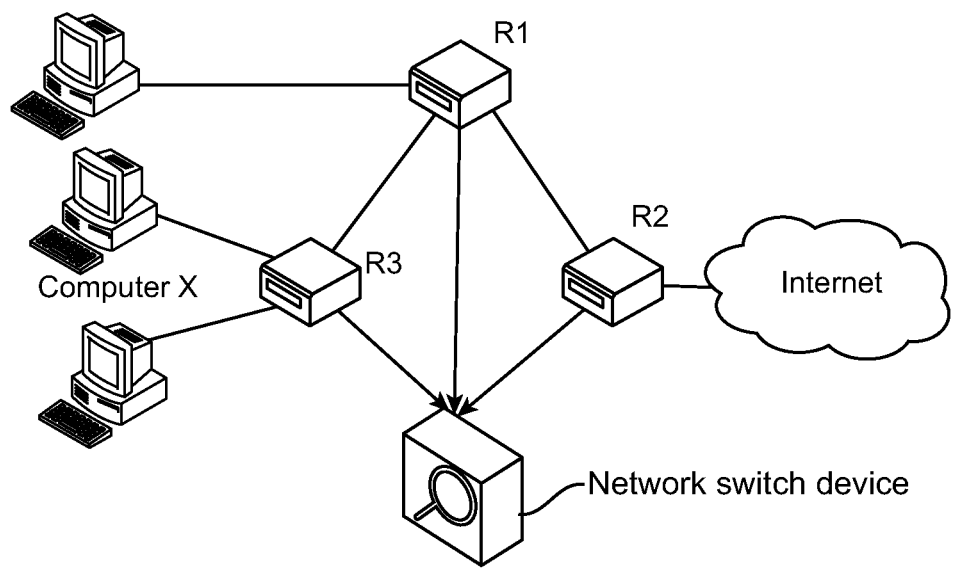
FIG. 2 illustrates another example of how a duplicate packet may be created.

FIG. 2 illustrates another example in which duplicate packet(s) may be created. To monitor a network that includes many switches and routers, it may be necessary to tap all of these networking devices. This is because traffic between two endpoints can travel through different paths and there is no guarantee that all traffic will pass through a single node. In the illustrated example, traffic from the Internet being sent to computer X may pass through three different routers R1-R3. A network switch appliance tapping to three routers will see three instances of the same information being sent to computer X.

Duplicate packet may also result when a network is misconfigured. For example, a user of a network switch appliance may create a physical loop by connecting two Ethernet ports of the same or different switches without properly configuring spanning tree protocol. The user may also misconfigure VLAN domain which causes packet leakage. Furthermore, a network device may malfunction and create packet copies randomly. Duplicate packet is undesirable because when duplicate packet is delivered to a network monitoring tool, the network monitoring tool may perform unnecessary analysis on the duplicate packet that is already performed.

Figure 3:
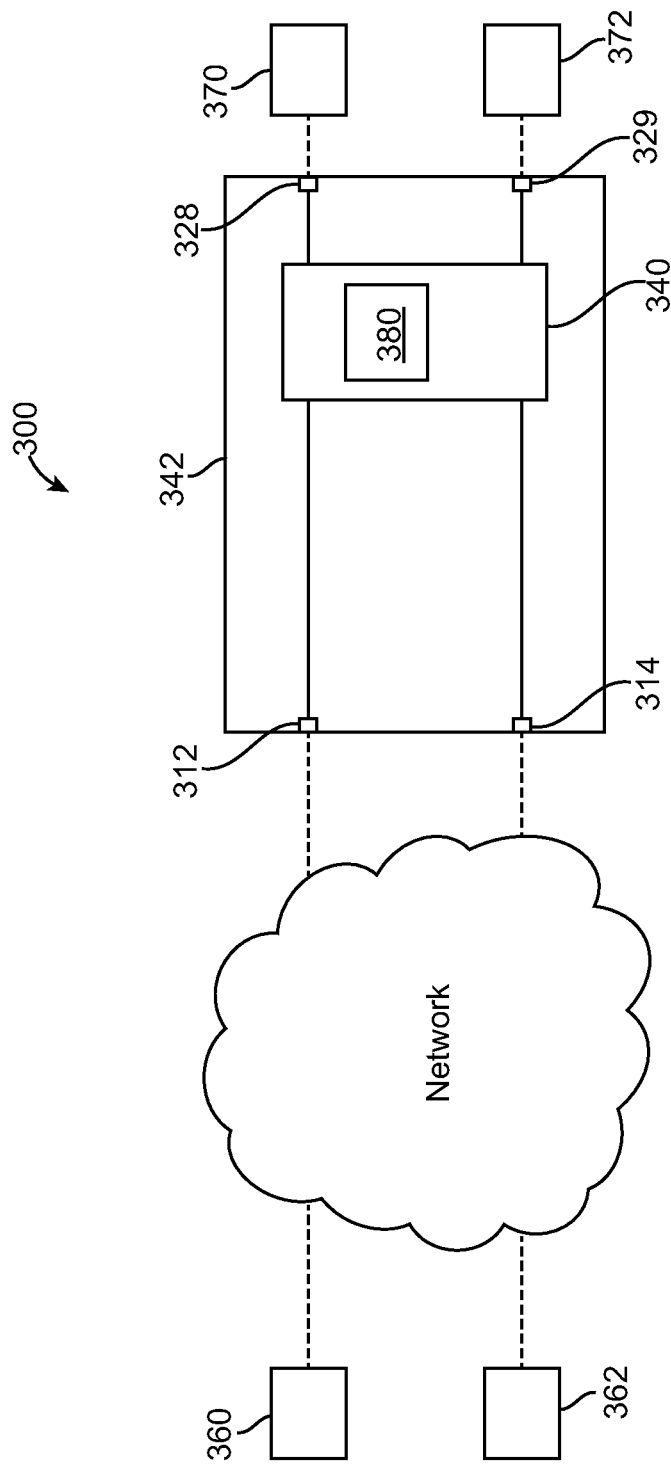
FIG. 3 illustrates a packet switch device in accordance with some embodiments.

FIG. 3 illustrates a network switch device 300 that is configured for performing duplicate packet identification and packet de-duplication in accordance with some embodiments. The network switch device 300 includes a first network port 312, a second network port 314, a first instrument port 328, and a second instrument port 329. The device 300 also includes a packet switch 340, and a network switch housing 342 for containing the packet switch 340. In the illustrated embodiments, the device 300 also includes other components, such as a Network PHY (not shown) coupled to each of the respective ports 312, 314, wherein the Network PHYs may be considered to be parts of the packet switch 340. Alternatively, the Network PHYs may be considered to be components that are separate from the integrated circuit 340. The PHY is configured to connect a link layer device to a physical medium such as an optical fiber, copper cable, etc. In other embodiments, instead of the PHY, the device 300 may include an optical transceiver, or a SERDES, etc. The housing 342 allows the device 300 to be carried, transported, sold, and/or operated as a single unit. The ports 312, 314, 328, 329 are located at a periphery of the housing 342. In other embodiments, the ports 312, 314, 328, 329 may be located at other locations relative to the housing 342. Although two network ports 312, 314 are shown, in other embodiments, the device 300 may include more than two network ports. Also, although two instrument ports 328, 329 are shown, in other embodiments, the device 300 may include only one instrument port, or more than two instrument ports.

During use, the first network port 312 of the device 300 is communicatively coupled to a first node 360, and the second port 314 is communicatively coupled to a second node 362. The device 300 is configured to communicate packets between the first and second nodes 360, 362 via the network ports 312, 314. Also, during use, the instrument ports 328, 329 of the device 300 are communicatively coupled to respective instruments 370, 372. The instruments 370, 372 may be directly coupled to the device 300, or communicatively coupled to the device 300 through the network (e.g., Internet). In some cases, the device 300 may receive packets that are duplicates via the span ports of the two nodes 360 and 362. In such cases, the device 300 is configured to perform packet de-duplication to remove the duplicate(s) before forwarding the packet to the instrument 370 and/or instrument 372. In some cases, the device 300 is provided as a single unit that allows the device 300 to be deployed at a single point along a communication path. In the illustrated embodiments, the packet switch 340 is configured to receive packets from nodes 360, 362 via the network ports 312, 314, and process the packets in accordance with a predefined scheme. For example, the packet switch 340 may pass packets received from one or more nodes to one or more instruments that are connected to respective instrument port(s) 328, 329.

In any of the embodiments, the packet switch 340 may be any switch module that provides packet transmission in accordance with a pre-determined transmission scheme. In some embodiments, the packet switch 340 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 300 after the packets have been processed), such as an intrusion prevention system. In other embodiments, the packet switch 340 may be configured such that the packets may be transmitted in a one-to-many configuration (i.e., from one network port to multiple instrument ports). In other embodiments, the packet switch 340 may be configured such that the packets may be transmitted in a many-to-many configuration (i.e., from multiple network ports to multiple instrument ports). In further embodiments, the packet switch 340 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 300 so that the packets (or certain types of packets) are routed according to any one of these configurations. In some embodiments, the packet movement configuration is predetermined such that when the device 300 receives the packets, the device 300 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 340 that may be used to implement features described herein include any of the commercially available network switch devices, such as GigaVUE™, that is available at Gigamon LLC. Other examples of packet switch 340 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 340 may have the functionalities of a conventional packet switch except that it provides visibility into various parts of a network. Thus, embodiments of the packet switch 340 may operate like a conventional managed packet switch, but providing packet monitoring function. This is accomplished by configuring the packet switch 340 to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch 340 that may be used with the device 300 is not limited to the examples described above, and that other packet switches 340 with different configurations may be used as well. Also, in any of the embodiments described herein, the packet switch 340 may be implemented using an integrated circuit, such as a processor (e.g., a general purpose processor, a network processor, an ASIC processor, a FPGA processor, etc.).

In the illustrated embodiments, the network switch device 300 also includes an integrated circuit 380 for determining whether a received packet at the network switch device 300 is a duplicate packet, and for performing packet de-duplication, in accordance with some embodiments. In the illustrated embodiments, the integrated circuit 380 is illustrated as a component of the packet switch 340. In other embodiments, the integrated circuit 380 may be a separate component from the packet switch 340. The integrated circuit 380 may be implemented using a processor, such as a general processor, a network processor, an ASIC processor, a FPGA processor, etc. Also, in some embodiments, the same processor that is used to implement the packet switch 340 may also be used to implement functionalities of the integrated circuit 380. During use, the first network port 312 receives a packet from the first node 360 at the first network port 312, process the packet to determine if it is a duplicate packet, and pass the packet to the instrument port 328/329 for transmission downstream to tool 370/372. When the device 300 (e.g., component 380) determines that the packet is a duplicate packet, then the device 300 will prevent the packet from being transmitted to the instrument ports 328, 329 and/or the second network port 314. For example, the device 300 may be configured to drop the duplicate packet.

Figure 4:
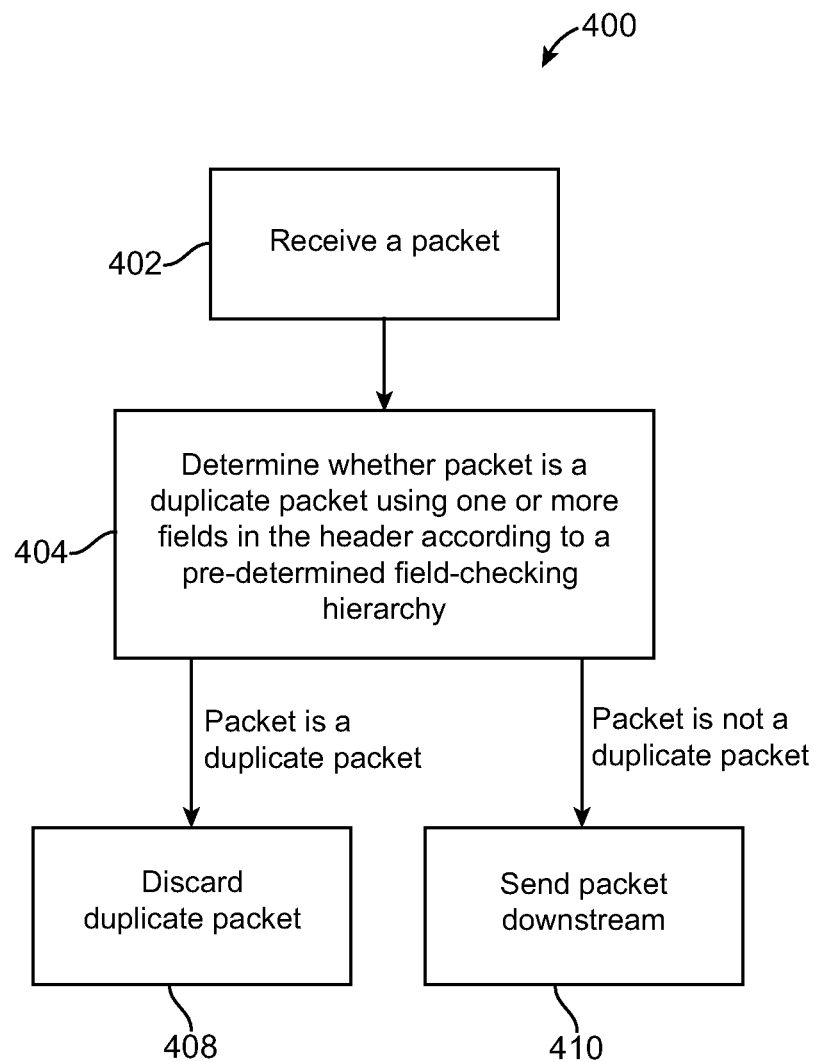
FIG. 4 illustrates a method performed by the packet switch device of FIG. 3 in accordance with some embodiments.

FIG. 4 illustrates a method 400 for performing packet de-duplication in accordance with some embodiments. First, a packet is received (step 402). This may be accomplished by the network switch device 300 of FIG. 3, which receives the packet through the first network port 312.

Figure 5:
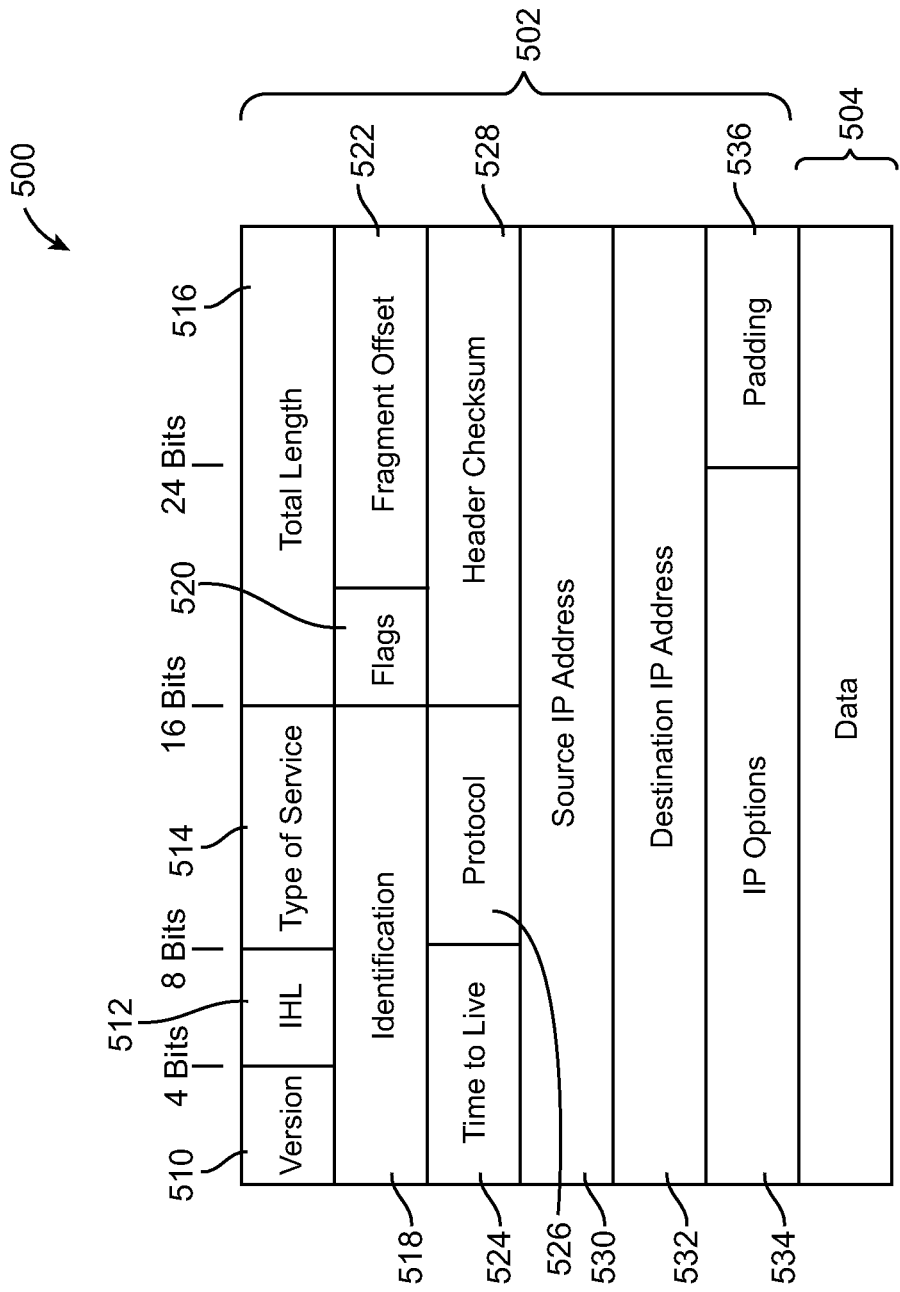
FIG. 5 illustrates a packet with an IPv4 header that may be received by the packet switch device of FIG. 3 in accordance with some embodiments.

The received packet includes a header and payload, wherein the header includes a plurality of fields. FIG. 5 illustrates an example of a structure of a packet 500 in accordance with some embodiments. The packet 500 includes a header 502 and payload data 504. The header 502 includes a plurality of fields 510-536. In particular, the header 502 includes version field 510, IHL field 512, type of service field 514, total length field 516, identification field 518, flags field 520, fragment offset field 522, time to live field 524, protocol field 526, header checksum field 528, source IP address 530, destination IP address 532, IP options field 534, and padding field 536.

Version field 510: The first header field in an IP packet is the four-bit version field. For IPv4, this has a value of 4.

Internet Header Length (IHL) field 512: The second field (4 bits) is the Internet Header Length (IHL) telling the number of 32-bit words in the header. Since an IPv4 header may contain a variable number of options, this field specifies the size of the header (this also coincides with the offset to the data). The minimum value for this field is 5 (RFC 791), which is a length of 5×32=160 bits=20 bytes. Being a 4-bit value, the maximum length is 15 words (15×32 bits) or 480 bits=60 bytes.

Type of service field 514: This field is also known as Differentiated Services Code Point (DSCP), which is defined by RFC 2474 for Differentiated services. Some transmissions may require real-time data streaming and therefore may make use of the DSCP field. An example is Voice over IP (VoIP) that is used for interactive data voice exchange.

Total Length field 516: This 16-bit field defines the entire datagram size, including header and data, in bytes. The minimum-length datagram is 20 bytes (20-byte header+0 bytes data) and the maximum is 65,535, which is the maximum value of a 16-bit word.

Identification field 518: This field is an identification field and is primarily used for uniquely identifying fragments of an original IP datagram.

Flags field 520: A three-bit field follows and is used to control or identify fragments. They are (in order, from high order to low order):
   bit 0: Reserved; must be zero.
   bit 1: Don't Fragment (DF)
   bit 2: More Fragments (MF)
If the DF flag is set and fragmentation is required to route the packet then the packet will be dropped. This can be used when sending packets to a host that does not have sufficient resources to handle fragmentation.

Fragment Offset field 522: The fragment offset field, measured in units of eight-byte blocks, is 13 bits long and specifies the offset of a particular fragment relative to the beginning of the original unfragmented IP datagram. The first fragment has an offset of zero. This allows a maximum offset of (213−1)×8=65,528 bytes which would exceed the maximum IP packet length of 65,535 bytes with the header length included (65,528+20=65,548 bytes).

Time To Live (TTL) field 524: An eight-bit time to live field helps prevent datagrams from persisting (e.g. going in circles) on an internet. This field limits a datagram's lifetime. It is specified in seconds, but time intervals less than 1 second are rounded up to 1. In latencies typical in practice, it has come to be a hop count field. Each router that a datagram crosses decrements the TTL field by one. When the TTL field hits zero, the packet is no longer forwarded by a packet switch and is discarded.

Protocol field 526: This field defines the protocol used in the data portion of the IP datagram.

Header Checksum field 528: The 16-bit checksum field 528 is used for error-checking of the header. At each hop, the checksum of the header must be compared to the value of this field. If a header checksum is found to be mismatched, then the packet is discarded. Note that errors in the data field are up to the encapsulated protocol to handle.

Source address 530: An IPv4 address is a group of four octets for a total of 32 bits. The value for this field is determined by taking the binary value of each octet and concatenating them together to make a single 32-bit value. For example, the address 10.9.8.7 would be 00001010000010010000100000000111. This address is the address of the sender of the packet. Note that this address may not be the "true" sender of the packet due to network address translation. Instead, the source address will be translated by the NATing machine to its own address. Thus, reply packets sent by the receiver are routed to the NATing machine, which translates the destination address to the original sender's address.

Destination address 532: Similar to the source address field but indicates the receiver of the packet.

Options field 534: This may be one or more additional header fields that follow the destination address field. Sometimes the options field 534 is not used.

Padding field 536: This is to align the header to a 32-bit boundary. If options are added to the IP header, then this field may be necessary.

Figure 6A:
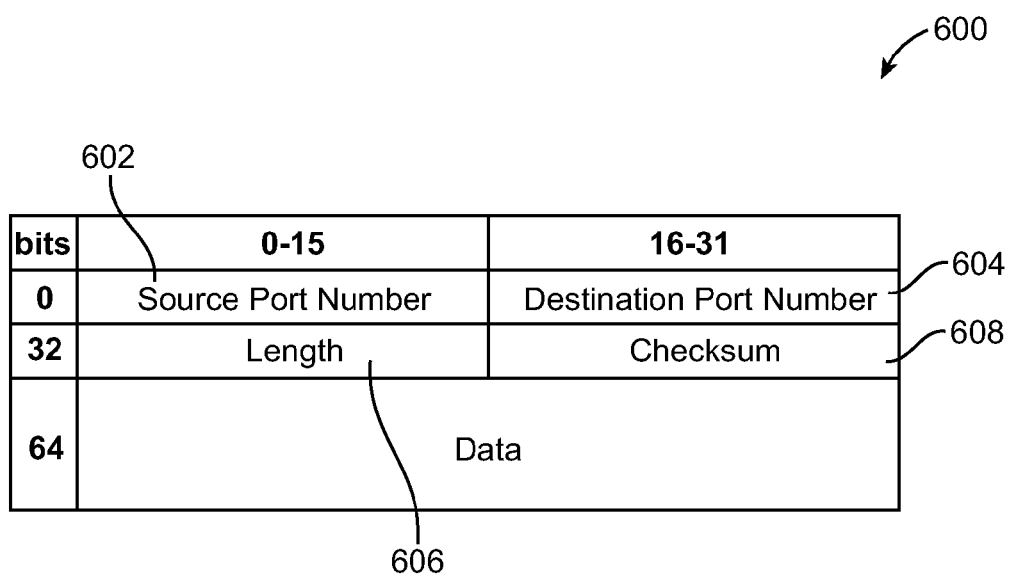
FIG. 6A illustrates a packet with a UDP header that may be received by the packet switch device of FIG. 3 in accordance with some embodiments.

FIG. 6A illustrates another example of a packet 600 in accordance with some embodiments. In the illustrated example, the packet 600 is a UDP packet, which is a minimal message-oriented Transport Layer protocol. As shown in the figure, the UDP header includes four fields, all of which are 2 bytes (16 bits). The source port number field 602 identifies the sender's port. If the field is not used, then it has a value of zero. If the source host is a client, the port number is likely to be an ephemeral port number. The destination port number field 604 identifies the receiver's port. If the client is the destination host, then the port number will likely be an ephemeral port number. If the destination host is the server, then the port number will likely be a well-known port number. The length field 606 specifies the length in bytes of the entire datagram—i.e., the header and data. The minimum length is 8 bytes since that is the length of the header. The field size sets a theoretical limit of 65,535 bytes (8 byte header plus 65,527 bytes of data) for a UDP datagram. The checksum field 608 is used for error-checking of the header and data. If the checksum is omitted in IPv4, the field uses the value all-zeros.

Figure 6B:
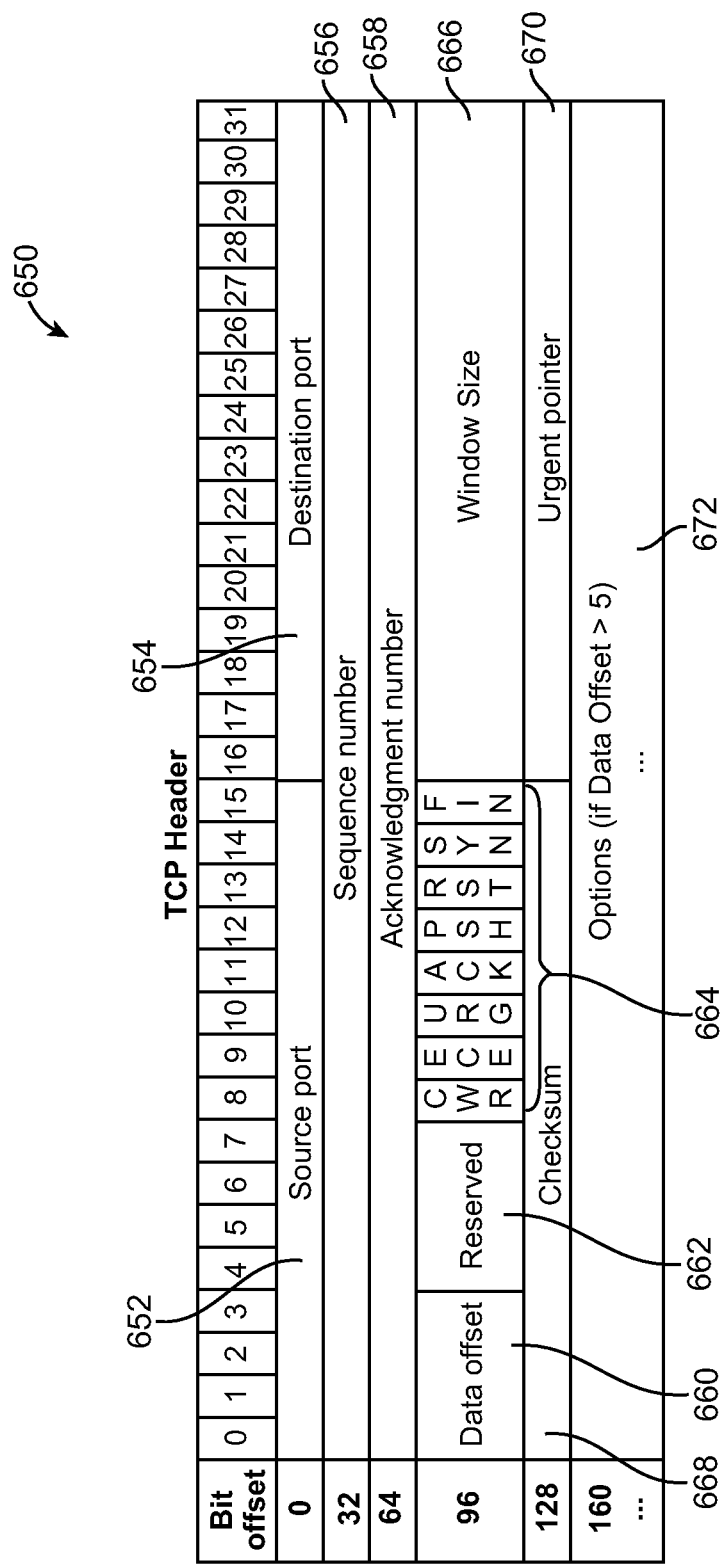
FIG. 6B illustrates a packet with a TCP header that may be received by the packet switch device of FIG. 3 in accordance with some embodiments.

FIG. 6B illustrates another example of a packet 650 that may be received by the network switch device 300 in accordance with some embodiments. In the illustrated example, the packet 650 is a Transmission Control Protocol (TCP) packet. The TCP header includes a source port field 652, a destination port field 654, a sequence number field 656, an acknowledgment number field 658, a data offset field 660, a reserved field 662, a flag field 664, a window field 666, a checksum field 668, an urgent pointer field 670, and an option field 672. The source port field 652 identifies the sending port. The destination port field 654 identifies the receiving port. The sequence number field 656 identifies the initial sequence number if a SYN flag is set, and identifies an accumulated sequence number of a first data byte of a packet for a current session if a SYN flag is clear. The acknowledgment number field 658 is for acknowledging receipt of prior bytes (if any). The dataoffset field 660 specifies the size of the TCP header in 32-bit words. The reserved field 662 is for any prescribed use, and may be set to zero. The flag field 664 allows various flags (CWR, ECE, URG, ACK, PSH, RST, SYN, FIN flags) to be set. The window field 666 identifies the size of the receive window, which is the number of bytes beyond the sequence number in the acknowledgment field that the receiver is currently willing to receive. The checksum field 668 is a 16-bit checksum field for error-checking of the header and data. The urgent pointer field 670 is a 16-bit field. If the URG flag is set, then this field is an offset from the sequence number indicating the last urgent data byte. The option field 672 allows various options to be set.

It should be noted that the type of packet that may be received by the device 300 is not limited to the examples described previously, and that the device 300 may receive other types of packets with different header configurations.

Returning to the method 400 of FIG. 4, next, the network switch device 300 determines whether the received packet is a duplicate packet using one or more of the plurality of fields in the header of the packet according to a pre-determined field-checking hierarchy (Step 404). In the illustrated embodiments, the pre-determined field-checking hierarchy prescribes certain one(s) of the plurality of fields in the header that has a relatively higher change rate statistically to be checked before others that have relatively lower change rate statistically.

In some embodiments, the device 300 is configured to first check the IPID field (e.g., field 518) in the header against another IPID field in another header of an earlier received packet before other fields. This feature is advantageous because the value of the IPID field has the highest change rate statistically (i.e., it changes more frequently) from packet to packet compared to other fields. Thus, if two packets have the same IPID field value, then there is a high chance that one of the two packets is a duplicate packet. In some embodiments, the device 300 is configured to check the IPID field by determining an identification value for the identification field in the header of the received packet, and determining whether the identification value of the packet matches an identification value in a header of a another packet that was received earlier.

In some embodiments, the device 300 is also configured to check the first 64 bits in the header against the first 64 bits in another header of an earlier received packet to determine whether the packet is a duplicate packet. For TCP header, the first 64 bits include the source port, the destination port, and sequence number. For UDP header, the first 64 bits include the source port, the destination port, length, and checksum. In other embodiments, instead of the first 64 bits in the header, the device 300 may be configured to check other prescribed number (N) of bits (which may be more than 64 bits or less than 64 bits, for examples) in the header to determine whether the packet is a duplicate packet. The prescribed number N may be any value that is greater than zero.

Also, in some embodiments, the device 300 is configured to check the destination IP address and/or the source IP address in the header against the corresponding destination/source IP address in the header of an earlier received packet to determine whether the packet is a duplicate packet.

In further embodiments, the device 300 is configured to check the fragment offset in the header against the fragment offset in another header of an earlier received packet. This has the benefit of enhancing the reliability of the duplication detection in case the IPID value rolls over (recycling of the IPID value).

In one implementation, the device 300 is configured to check different fields in the header against corresponding fields in another header of an earlier received packet according to a pre-determined field-checking hierarchy, which prescribes the following order for checking the fields in the header: IPID, first 64 bits (or other number of bits) in the header, source IP address, destination IP address, and fragment offset. In another implementation, the pre-determined field-checking hierarchy may prescribe the following order for checking the fields in the header: IPID, source IP address, and fragment offset. In other embodiments, the device 300 may be configured to check additional fields from the header. Also, in other embodiments, the order for checking the above items may be different as long as one of the fields with a higher change rate is checked before another one of the fields with a lower change rate. For example, in other embodiments, the order of checking may be as follows: the first 64 bits (or other number of bits) in the header, IPID, source IP address, destination IP address, and fragment offset. Also, in further embodiments, any combination of the above items may be checked simultaneously. In addition, in any of the embodiments described herein, the fragment offset may not need to be checked in order to identify a duplicate packet, and thus, the act of checking the fragment offset may not need to be performed.

In any of the embodiments described herein, the network switch device 300 is configured to check the packet against an earlier packet that was received within a prescribed time window (period). In such cases, the packet is determined by the device 300 to be a duplicate packet when certain field(s) in its header matches with corresponding field(s) in the header of another packet (an earlier received packet), and when the packet and the earlier packet are received within a prescribed time period. Determining whether two packets are received within a prescribed time period to identify duplicate packet is advantageous because sometimes a node may intentionally transmit two identical packets at two different respective times. Intentionally transmission of two identical packets from a node is different from the situation in which packets are unintentionally copied during a network transmission or monitoring process. In particular, since duplicate packets that are unintentionally generated in the network transmission process occur very close in time from the original packet time (as opposed to a node that intentionally transmitting two identical packets, which occurs in respective times that are relatively further apart), the amount of time that is lapsed between reception of the two packets may be used to distinguish the two different scenarios. In particular, the device 300 operates on the assumption that if the two packets (with the same values in certain header fields) are received within the prescribed time period, then one of the packets is a duplicate packet generated during the network transmission process (and it is not resulted from a node sending a same packet twice). The prescribed time period may be any value set by a user of the device 300. For example, in some embodiments, the prescribed time period may be 100 milliseconds or less, and more preferably, 80 milliseconds or less. The prescribed time period may have other values in other embodiments.

In some embodiments, the checking of the fields in the header may be performed using a hashing technique. In such cases, the comparison between the packets is based on function values (e.g., hash) generated by applying a function (e.g., a hash function) to certain prescribed portion(s) of the packet. If the result of a comparison is a match, the packet switch device 300 declares the packet as a duplicate packet, and discards the duplicate packet. In one implementation, the device 300 computes a hash value on every packet based on certain offsets (e.g., the number of bytes counted from the beginning of a packet) that the user wants to start the comparison. The first packet with a new hash value (or values) is forwarded by the packet switch device 300 for transmission downstream. Any subsequent packets within a time window (i.e., a prescribed period since the reception of the first packet with the new hash value(s)) that has the same hash value(s) is discarded.

In some embodiments, hashing is performed individually for each of the fields in the header that are desired to be checked. For example, different hash values may be determined for the IPID value, first 64 bits in the header, source IP address, destination IP address, and fragment offset, respectively. In such cases, when checking the packet to determine whether it is a duplicate packet, the network switch device 300 is configured to compare the hash value of the field(s) against the corresponding hash value of the field(s) of an earlier received packet. For example, if the prescribe checking order involves checking the IPID first, then the device 300 will check the IPID hash value with corresponding IPID hash value of a previously received packet.

In other embodiments, if a plurality of fields is desired to be checked, then multiple fields in the header may be used to compute the hash value. For example, assuming that the IPID value, the first 64 bits in the header, and the destination/source IP address are desired to be checked first, then the network switch device 300 will compute a hash value using the IPID value, the first 64 bits (or a subset of it) in the header, and the destination/source IP address (or a subset of the bits in the destination/source IP address). The device 300 then compares such hash value against a corresponding hash value that was determined using the same fields in a previously received packet. In other embodiments, the fields that are desired to be checked first may be the IPID value, the source IP address, and the fragment offset.

In further embodiments, hashing for a plurality of fields in the header may be performed first, and the hash value is used to obtain a list of possible match. Then from the list of possible match, a linear search is performed using the pre-determined field-checking hierarchy as discussed previously to determine whether the packet is a duplicate packet. Such technique allows the search to be performed faster because the hash value narrows the number of possible matches. In this technique, for the hashing formula, the input may include a subset of the bytes from one or more fields. It is not necessary to include all of the bytes in every field since an exact match will be performed later anyway. For example, in some embodiments, the hash value may be generated using the most frequently changing fields, e.g., using IPID value, fragment offset, the lower 2 bytes of the source IP address, and the lower 2 bytes of the destination IP address. The hash value of the packet is then used to compare previously stored hash value (calculated similarly) in a lookup table. Since not all of the bytes in all prescribed fields are used in calculating the hash value, it is possible that there is a list of possible matches. In such cases, the device 300 then check the different fields in the header using the pre-determined field-checking hierarchy against corresponding fields in the header of the packets in the list of possible matches. If a match is found, then the packet is determined to be a duplicate packet. In some embodiments, for TCP packets, the device 300 is configured to include source port and check sum in generating the hash value. This has the benefit of reducing a number of hashing collisions (packets having the same hashing values).

In some embodiments, a memory at the device 300 (or that is communicatively coupled to the device 300) may store a table containing copies of the portions of the previously received packets used for comparisons. In other embodiments, the table may store the values generated by applying functions (e.g., a hash function) to those portions of previously received packets that are to be compared. In some cases, the first packet that generates a new hash value is forwarded out from the device 300 automatically. Within a time window, any subsequent packets that have the same hash value are discarded. Once the time window expires, the hash value of this sequence of packets is erased and the process starts again. Such technique has the benefit of preventing the table from becoming too large, and discarding information that is no longer needed for the duplicate packet identification process. In some embodiments, to record when a packet is received by the device 300, a table is used that has one row for each packet and 2 columns, one column for the timestamps and the second column having the hash signature of the packets.

Returning to the method 400 of FIG. 4, when the device 300 (e.g., component 380) identifies a duplicate packet, the device 300 then discard the duplicate packet (Step 408). Otherwise, the device 300 allows the non-duplicate packet to continue being part of the packet stream. In such cases, the device 300 then sends the packet (or a copy of it that is generated by the device 300) to an analysis tool that is coupled to the instrument port (Step 410). In other embodiments, in addition to, or instead of, sending the packets to an analysis tool through an instrument port, the device 300 may be configured for routing packets, filtering packets, slicing packets, modifying packets, copying packets, and/or flow controlling packets.

In some embodiments, when performing packet deduplication, the device 300 is configured to operate on the assumption that all of the tapped traffic are of the same L3 network. This means that the IP address space is the same, and an IP address is bind to a single node. This assumption allows the device 300 to ignore L2 header (VLAN) and L2.5 header (MPLS) operations for all IP packets. Thus, in some embodiments, even when VLAN/MPLS tag operations are performed on the packet, the device 300 may still detect duplicate packets. In other embodiments, the device 300 is not required to operate based on the above assumption.

Also, in some embodiments, the device 300 is configured to examine fields from the L3 (Layer 3, Network layer) headers and L4 (Layer 4, Transport layer) headers, but not L2 (Layer 2, Data link layer) headers. This is advantageous because L2 headers could be changed as the packets travel through the network (e.g., through various network devices). On the other hand, the fields in the L3 and L4 headers being used by the device 300 to check packet duplication do not change, thereby allowing the device 300 to reliably determine packet duplication. In some embodiments, the packet being processed by the device 300 in the de-duplication process includes a L3 IPv4 header or a L3 IPv6 header.

Figure 7:
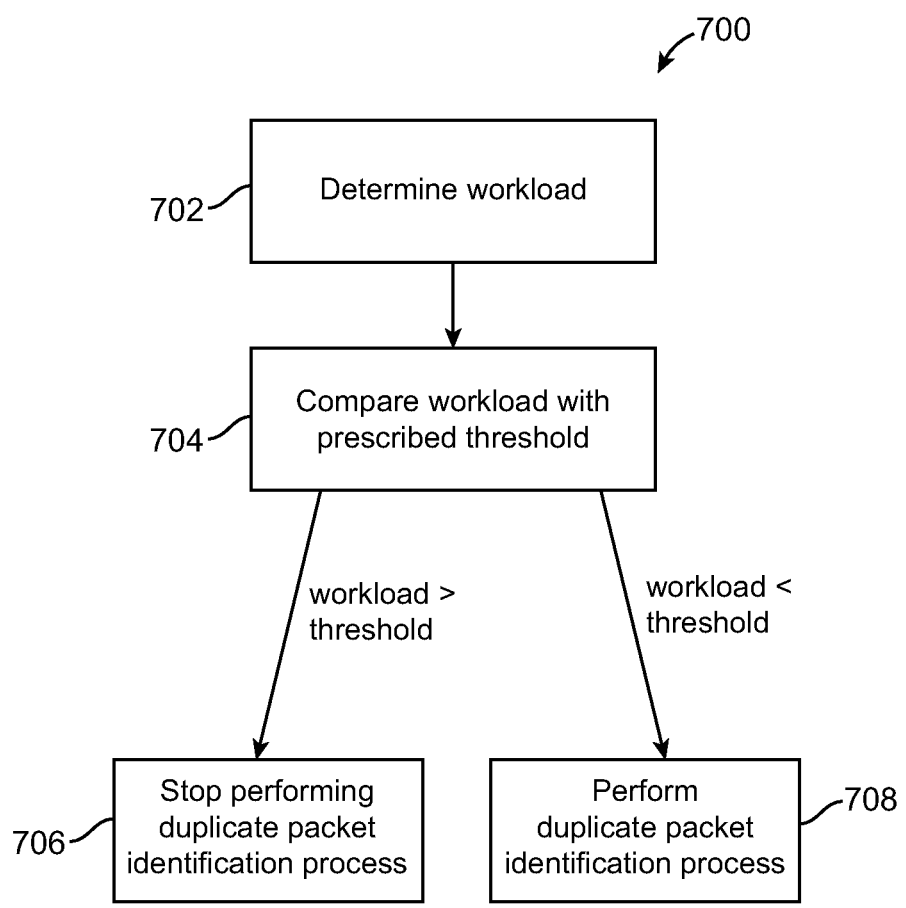
FIG. 7 illustrates another method that may be performed using the packet switch device of FIG. 3 in accordance with some embodiments.

In any of the embodiments described herein, the process of identifying duplicate packets may be conditioned upon an amount of workload at the device 300. In particular, in some embodiments, the device 300 may be configured to monitor the workload at the device 300. In such cases, when the device 300 determines that the amount of workload to be performed exceeds a prescribed threshold, the device 300 then stops the duplicate packet identification process, so that the device resource may be used to perform other tasks that are higher in priority. FIG. 7 illustrates a method 700 that may be performed by the device 300 (e.g., by the integrated circuit 380, the packet switch 340, or another component, such as another processor, etc.) in accordance with some embodiments. First the device 300 determines an amount of workload for the device 300 (Step 702). Such may be accomplished by the device 300 accessing a queue associated with the device 300 to determine the amount of workload. Alternatively, such may be accomplished by the device 300 determining an amount of resource utilization (which correlates with workload). Thus, as used in this specification, the term "workload" is not limited to an amount of work, and may refer a resource utilization, or other variable(s) that correlates with workload. Next, the device 300 compares the workload with a prescribed threshold (Step 704). The prescribed threshold may be any value set by a user in some embodiments. When the determined workload exceeds the prescribed threshold, the device 300 then stops performing the duplicate packet identification process (Step 706). On the other hand, when the determined workload is below the prescribed threshold, the device 300 continues performing the duplicate packet identification process (Step 708). Such feature allows the device 300 to focus on the tasks that may be higher in priority than the duplicate packet identification. For example, the task that may be higher in priority may be passing the packet to an instrument port or to a network port. In such cases, the act of passing the packet to the instrument port, and/or the act of passing the packet to the network port, may be performed regardless of whether the de-duplication task is performed by the device 300 or not. Thus, the functionality of passing packets to the instrument port and/or to the network port at the device 300 is not affected by the stopping of the secondary task(s).

In any of the embodiments described herein, the feature of stopping a task may utilize two thresholds, wherein a first threshold is used to stop the de-duplication process, and a second threshold is used to resume the de-duplication process. In one implementation, the first threshold may be for stopping the de-duplication task, wherein when the workload exceeds such first threshold, the device 300 will stop the de-duplication process. The second threshold has a value lower than the first threshold, and is for re-starting the de-duplication process. In such cases, wherein when the workload falls below the second threshold, the device will begin the de-duplication process. Such feature is advantageous because it will prevent or at least reduce a bouncy effect that may otherwise occur if only one threshold is used.

In any of the embodiments described herein, the process of identifying duplicate packets may be conditioned upon an amount of resource (e.g., memory) at the device 300. In particular, in some embodiments, the device 300 may be configured to monitor the resource at the device 300. In such cases, when the device 300 determines that the amount of remaining resource drops below a prescribed threshold, the device 300 then stops the duplicate packet identification process, so that the device resource may be used to perform other tasks that are higher in priority. In one implementation, the device 300 (e.g., the integrated circuit 380, the packet switch 340, or another component, such as another processor, etc.) may be configured to perform the following method in accordance with some embodiments. First the device 300 determines an amount of resource for the device 300. Such may be accomplished by the device 300 accessing one or more components (e.g., a memory) associated with the device 300 to determine the amount of available resource. Next, the device 300 compares the resource with a prescribed threshold. The prescribed threshold may be any value set by a user in some embodiments. When the determined resource is below the prescribed threshold, the device 300 then stops performing the duplicate packet identification process. Such feature allows the device 300 to focus on the tasks that may be higher in priority than the duplicate packet identification. For example, the task that may be higher in priority may be passing the packet to an instrument port or to a network port. In such cases, the act of passing the packet to the instrument port, and/or the act of passing the packet to the network port, may be performed regardless of whether the de-duplication task is performed by the device 300 or not. Thus, the functionality of passing packets to the instrument port and/or to the network port at the device 300 is not affected by the stopping of the secondary task(s).

In any of the embodiments described herein, the feature of stopping a task may utilize two thresholds, wherein a first threshold is used to stop the de-duplication process, and a second threshold is used to resume the de-duplication process. In one implementation, the first threshold may be for stopping the de-duplication task, wherein when the remaining resource falls below such first threshold, the device 300 will stop the de-duplication process. The second threshold has a value higher than the first threshold, and is for re-starting the de-duplication process. In such cases, wherein when the remaining resource is higher than the second threshold, the device will begin the de-duplication process. Such feature is advantageous because it will prevent or at least reduce a bouncy effect that may otherwise occur if only one threshold is used.

In further embodiments, the device 300 may be configured to examine both the workload and the remaining resource to determine whether to perform the packet de-duplication process. In some embodiments, when the workload exceeds a prescribed workload threshold, and when the remaining resource is below a prescribed resource threshold, then the device 300 stops the packet de-duplication process. Also, in some embodiments, when the workload is below the prescribed workload threshold, and when the remaining resource is above the prescribed resource threshold, then the device 300 resumes the packet de-duplication process. In other embodiments, when two thresholds are used for each of the workload and resource, the device resumes the packet de-duplication process when the workload is below a second prescribed workload threshold that is lower than a first prescribed workload threshold (for stopping the de-duplication process), and when the resource is above a second prescribed resource threshold that is higher than a first prescribed resource threshold (for stopping the de-duplication process).

It should be noted that the feature of stopping a task when workload (or resource utilization) becomes high and/or when device remaining resource becomes low is not limited to the task of determining packet duplication. In other embodiments, such feature may be used to stop other tasks that have relatively lower priority than others. For example, in some embodiments, the task of passing packets from one network port to another network port may be ranked higher in priority than other tasks (e.g., tasks that are unnecessary for performing the act of passing packets to a network port), in which case, any of such tasks may be stopped during use of the device 300. In other embodiments, the task of passing packets from one network port to an instrument port may be ranked higher in priority than other tasks (e.g., tasks that are unnecessary for performing the act of passing packets to an instrument port), in which case, any of such tasks may be stopped during use of the device 300. By means of non-limiting examples, task(s) that may be stopped includes one or more of packet filtering, packet slicing, packet modification (e.g., removing, adding, or changing one or more portions of a packet), and flow control of packets.

Figure 8:
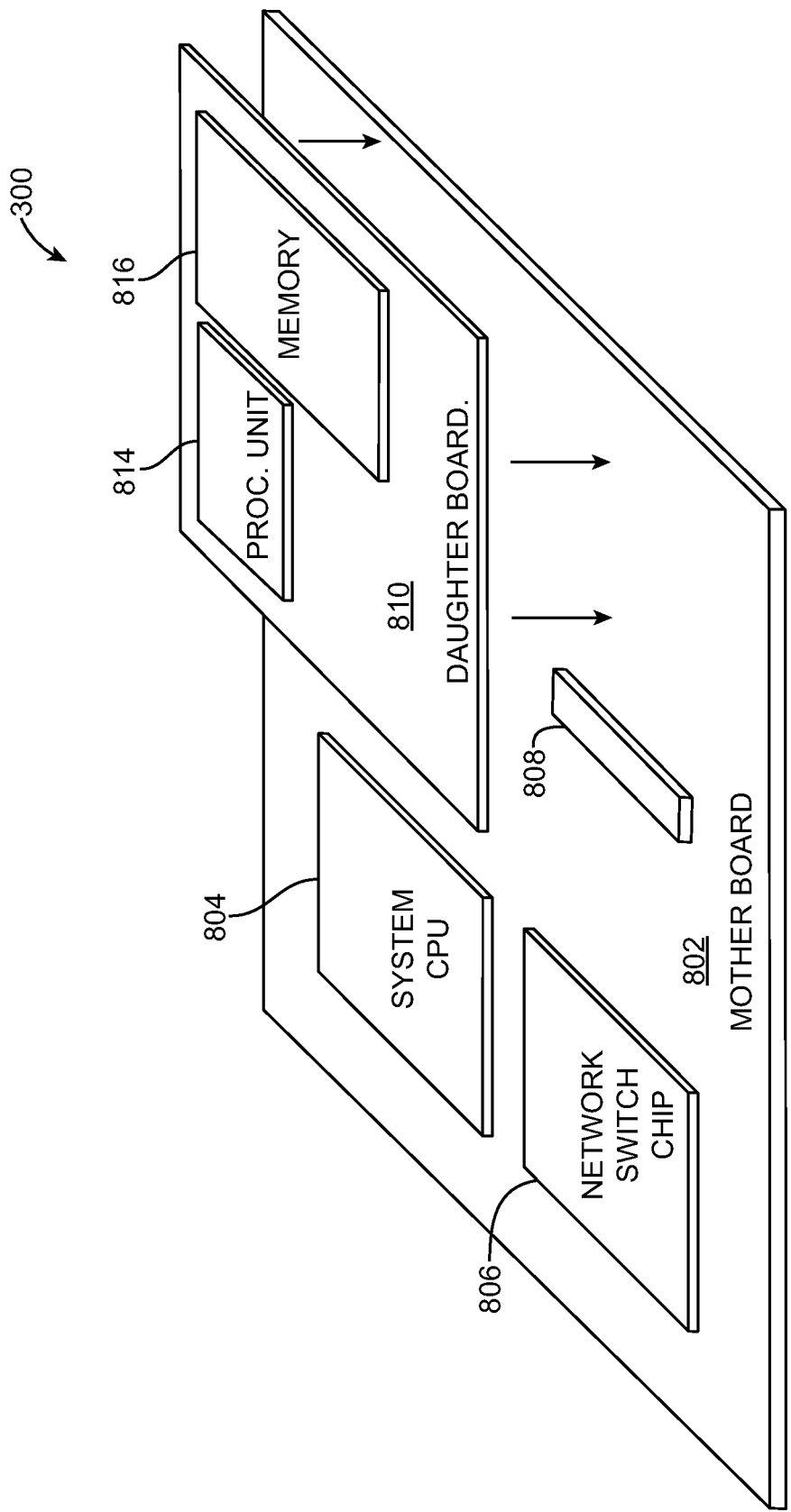
FIG. 8 illustrates an example of an implementation of the packet switch of FIG. 3 in accordance with some embodiments.

FIG. 8 illustrates an example of an implementation of the network switch device 300 of FIG. 3 in accordance with some embodiments. In the illustrated embodiments, the network switch device 300 includes a motherboard 802, which is the central or primary circuit board for the network switch device 300. The motherboard 802 includes a system CPU (central processing unit) 804, a network switch chip 806, and a connector 808. The CPU 804 is configured to interpret programming instructions and processes data, among other functions. The network switch chip 806, also referred to as an "Ethernet switch chip" or a "switch on-a-chip", provides packet switching and filtering capability in an integrated circuit chip or microchip design. The connector 808 provides the motherboard 802 with the capacity to removably accept peripheral devices or additional boards or cards. In some embodiments, the connector 808 allows a device, such as a daughter or expansion board, to directly connect to the circuitry of the motherboard 802. The motherboard 802 may also include numerous other components, such as, but not limited to, volatile computer readable storage medium and/or non-volatile computer readable storage medium (both of which may be considered examples of non-transitory medium), display processors, and/or additional peripheral connectors. The packet switch device 300 may also be configured with one or more hardware ports or connectors for connecting servers, terminals, IP phones, network instruments, or other devices to the packet switch device 300.

The network switch chip 806 is provided with a plurality of ports and may also be provided with one or more filters. The ports may each be half-duplex or full-duplex. Each of the ports may be configured, either separately, or in combination, as a network port, an instrument port, a transport port, or a loop-back port. Network ports are configured for connection to and/or from the network. Instrument ports are configured for connection to and/or from a network instrument, such as a packet sniffer, intrusion detection system, or the like. Transport ports are configured for connection to and/or from another network switch ship, another switch device (appliance), or a processor unit.

In some embodiments, the network switch device 300 may include instructions stored on a computer readable medium for configuring single or dual port loop-back ports. The instructions may be executed on the CPU 804. Each loop-back port reduces the number of ports available to be configured as a network, instrument, or transport port by at least one.

Also, in some embodiments, each of the ports of the network switch chip 806 may be associated with one or more packet filters that drop or forward a packet based on a criterion.

As shown in the illustrated embodiments of FIG. 8, the packet switch device 300 may include a daughter board 810 configured to be removably connected to the motherboard 802 via the connector 808. The daughter board 810 may be connected parallel to or in the same plane as the motherboard 802, as shown. In the parallel configuration, the daughter board 810 may also be referred to as a mezzanine board. Alternatively, the daughter board 810 may be oriented perpendicularly to the plane of the motherboard 802, or it may be connected in a different orientation. The daughter board 810 provides, in addition to packet distribution capabilities, other packet processing capabilities. The daughter board 810 has a processor unit 814, and a memory 816. As with the motherboard 802, the daughter board 810 may also include numerous other components (like those discussed with reference to the motherboard 802). The processor unit 814 may be any integrated circuit capable of routing and processing packets, such as duplicate packet identification and packet deduplication described herein. In some embodiments, the daughter board 810 may be used to implement the integrated circuit 380 for performing packet deduplication. In other embodiments, the motherboard 802 may be used to implement the integrated circuit 380 for performing packet deduplication. In further embodiments, both the motherboard 802 and the daughter board 810 may be used to implement the integrated circuit 380 for performing packet deduplication.

In other embodiments, the processing unit 814 and the memory 816 are parts of a blade server, parts of motherboard 802, or parts of a module in a network switch chip.

Figure 9:
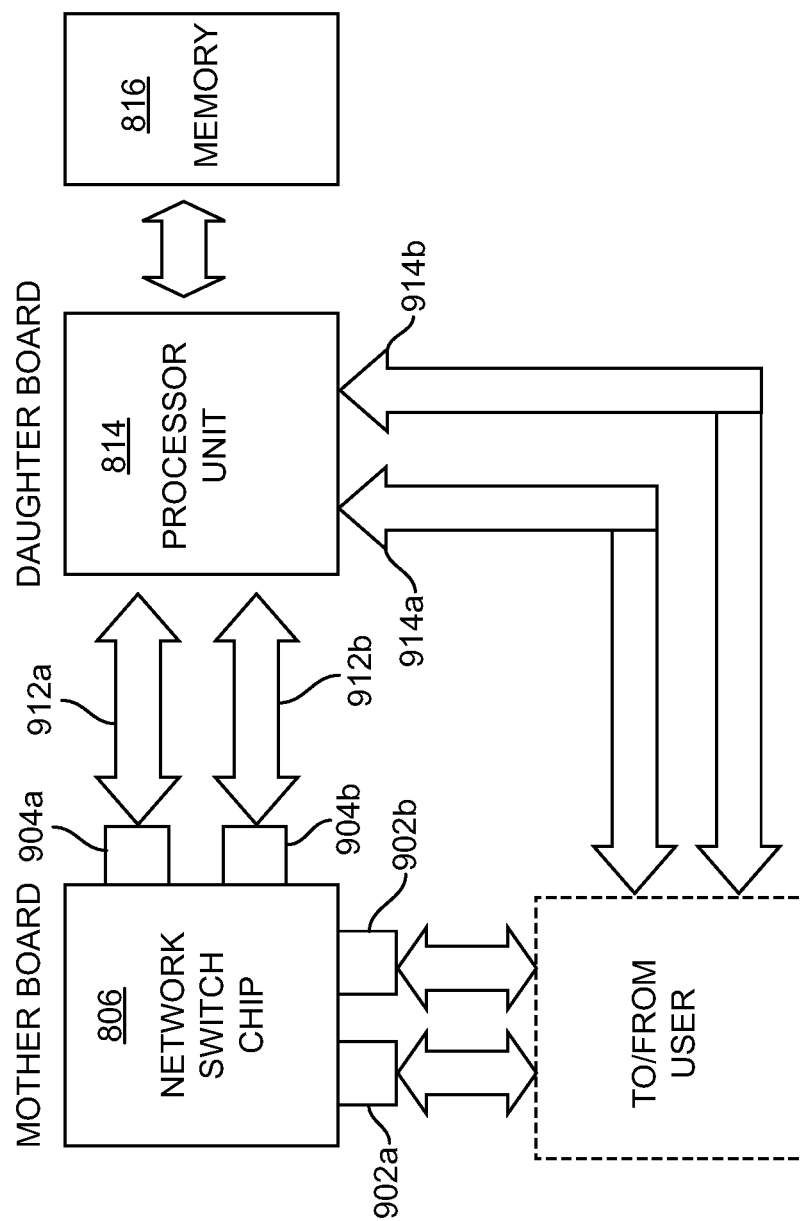
FIG. 9 illustrates an exemplary packet handling process by the packet switch device of FIG. 8 in accordance with some embodiments.

FIG. 9 illustrates logically an example of packet flow in the network switch device 300 of FIG. 8 in accordance with some embodiments. In some cases, a packet may be routed from an ingress port to an egress port that are both located on the network switch chip 806. Assume that port 902*a* is a network port on the network switch chip 806, that port 902*b* is an instrument port on the network switch chip 806, that ports 904*a* and 904*b* are transport ports on the network switch chip 806, and that connections 912*a* and 912*b* are connections between network switch chip 806 and the processor unit 814. Further assume that the packet switch device 300 is configured to route all packets from the network port 902*a* to the instrument port 902*b*. An ingress packet received at the network port 902*a* is routed to the transport port 904*a* for egress by the network switch chip 806. The packet is received by the processor unit 814 via the connection 912*a*. In other embodiments, the ingress packet is routed via the transport port 904*b* and received at connection 912*b*. The packet is routed back to the network switch chip 806 through connections 912*a* and transport port 904*a* for egress at instrument port 902*b*. The packet deduplication feature described herein may be performed by component(s) at the daughter board 810, component(s) at the motherboard 802, or components at both the motherboard 802 and the daughter board 810.

It should be noted that the packet switch device 300 is not limited to the configuration described previously, and that the packet switch device 300 may have different configurations in other embodiments. For example, in other embodiments, the device 300 may not have any daughter board. In such cases, the packet deduplication feature described herein may be performed by a processor or another integrated circuit that is located on the motherboard 802.

Figure 10:
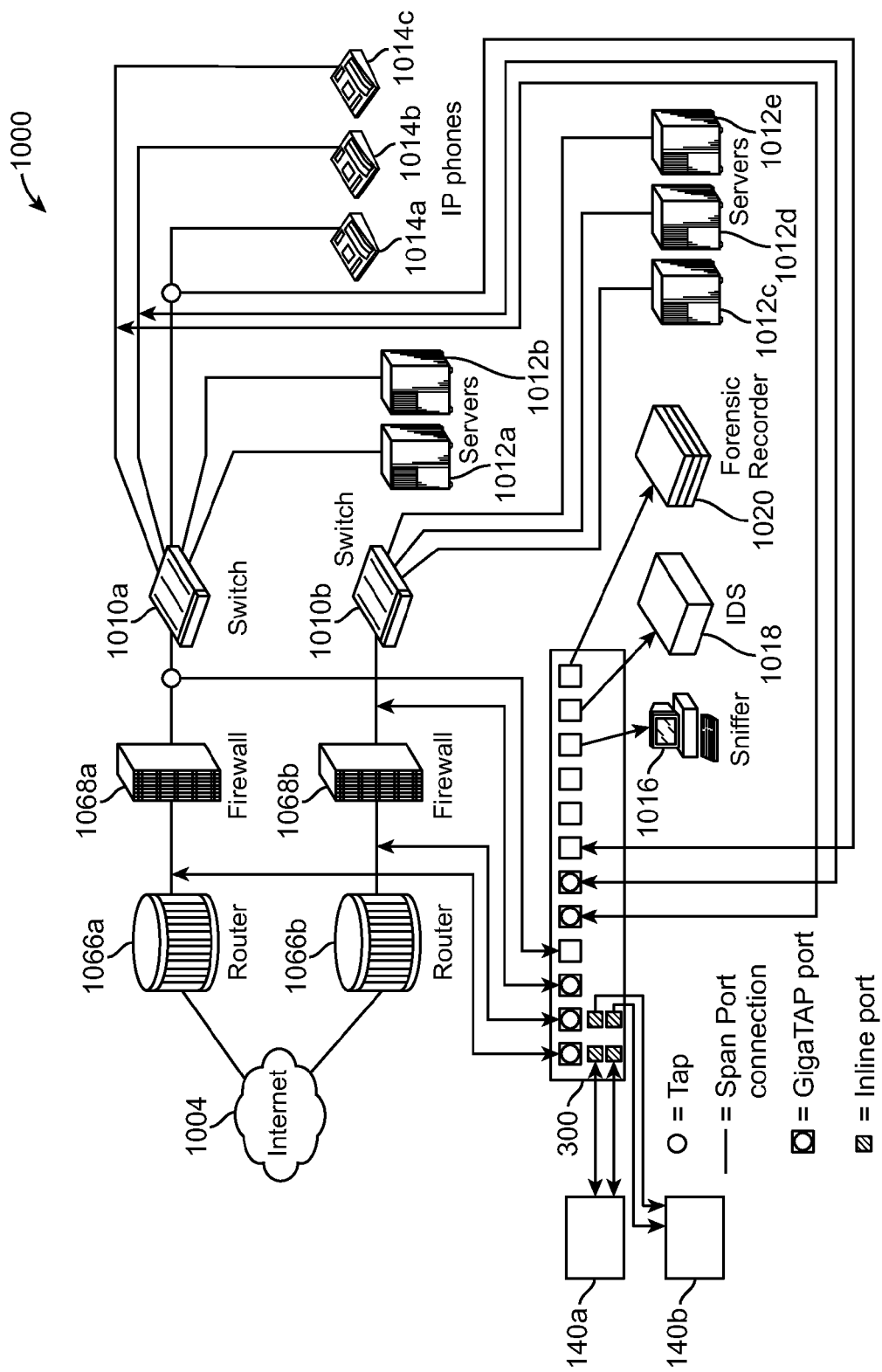
FIG. 10 shows an example of a deployment of the network switch device of FIG. 3 in a network environment in accordance with some embodiments.

FIG. 10 shows the deployment of the network switch device 300 in a network environment 1000 in accordance with some embodiments. The Internet 1004 is coupled via routers 1006*a*-*b* and firewalls 1068*a*-*b* to two switches 1010*a* and 1010*b*. Switch 1010*a* is coupled to servers 1012*a*-*b* and IP phones 1014*a*-*c*. Switch 1010*b* is coupled to servers 1012*c*-*e*. A sniffer 1016, an IDS 1018 and a forensic recorder 1020 (collectively, "non-pass through instruments") are coupled to the device 300. As illustrated in FIG. 10, there is a reduction on the number of non-pass through instruments in this deployment as compared to a conventional configuration (in which there may be one or more non-pass through instruments between router 1066*a* and firewall 1068*a*, one or more non-pass through instruments between firewall 1068*a* and switch 1010*a*, one or more non-pass through instruments between router 1066*b* and firewall 1068*b*, and firewall 1068*b* and switch 1010*b*) because the same non-pass through instruments can now access information anywhere in the network environment 1000 through the device 300. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014*a*-*c* can be easily configured to be sent to an IDS 1018. It is also possible that traffic inside a particular IP phone 1014*a*-*c* connection can be sent to a sniffer 1016, and Intrusion Detection System 1018 and a forensic recorder 1020 simultaneously via the one-to-many function. The packet deduplication feature of the device 300 described herein allows the device 300 to detect duplicate packets transmitted from any of the sources to the device 300, and allows the device 300 to drop the duplicate packets so that they are not transmitted from the device 300 downstream.

In some embodiments, when using the device 300, one or more non-pass through instruments (such as IDS, sniffer, forensic recorder, etc.) may be connected to instrument port(s), and one or more pass through instruments 140*a*, 140*b* (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 300, the device 300 can compare whether the IDS or the IPS sees more threats, and/or can have a redundant protection such that if the IPS misses any threat, the IDS may pick it up.

It should be noted that when a "packet" is described in this application, it should be understood that it may refer to the original packet that is transmitted from a node, or a copy of it.

It should be noted that the term "first" (as in "first packet" for example), and the term "second" (as in "second packet" for example), are used to refer to different things, and do not necessarily refer to the order of things. Thus, the term "first packet" does not necessarily refer to a packet that is "first" received, and may refer to any packet that is different from a "second" packet. Similarly, the term "second packet" does not necessarily refer to a packet that is received in the "second" order, and may refer to any packet that is different from a "first" packet.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method of packet processing, comprising:
  receiving a first packet that includes a header, the header having a plurality of fields; and
  determining whether the first packet is a duplicate packet using a first one of the plurality of fields according to a pre-determined field-checking hierarchy;
  wherein the pre-determined field-checking hierarchy prescribes the first one of the plurality of fields to be checked before a second one of the plurality of fields, the first one of the plurality of fields having a higher change rate statistically than the second one of the plurality of fields; and
  wherein the first packet is determined to be the duplicate packet when the first one of the plurality of fields matches a respective one of fields in a second packet that is received before the first packet, and when the first packet is received within a prescribed time period since the second packet is received.

2. The method of claim 1, wherein the one of the plurality of fields includes an identification field for identifying the first packet.

3. The method of claim 1, further comprising using a prescribed number of bits in the header to determine whether the first packet is the duplicate packet.

4. The method of claim 1, further comprising:
  determining a destination IP address; and
  using the destination IP address to determine whether the first packet is the duplicate packet.

5. The method of claim 1, further comprising:
  determining a source IP address; and
  using the source IP address to determine whether the first packet is the duplicate packet.

6. The method of claim 1, further comprising:
  determining a fragment offset that is associated with the first packet; and
  using the fragment offset to determine whether the first packet is the duplicate packet.

7. The method of claim 1, further comprising determining an amount of workload in an appliance, wherein the act of determining whether the first packet is the duplicate packet is performed when the amount of workload is below a prescribed threshold.

8. The method of claim 1, wherein the prescribed time period is 100 milliseconds or less.

9. The method of claim 1, wherein the header of the first packet comprises a L3 IPv4 or L3 IPv6 header.

10. A packet switch system, comprising:
- a first port configured for receiving a first packet that includes a header, the header having a plurality of fields; and
- an integrated circuit configured for:
- determining whether the first packet is a duplicate packet using a first one of the plurality of fields according to a pre-determined field-checking hierarchy;
- wherein the pre-determined field-checking hierarchy prescribes the first one of the plurality of fields to be checked before a second one of the plurality of fields, the first one of the plurality of fields having a higher change rate statistically than the second one of the plurality of fields; and
- wherein the integrated circuit is configured to determine the first packet as the duplicate packet when the first one of the plurality of fields matches a respective one of fields in a second packet that is received before the first packet, and when the first packet is received within a prescribed time period since the second packet is received.

11. The system of claim 10, wherein the one of the plurality of fields includes an identification field for identifying the first packet.

12. The system of claim 10, wherein the integrated circuit is further configured for using a prescribed number of bits in the header to determine whether the first packet is the duplicate packet.

13. The system of claim 10, wherein the integrated circuit is further configured for:
- determining a destination IP address; and
- using the destination IP address to determine whether the first packet is the duplicate packet.

14. The system of claim 10, wherein the integrated circuit is further configured for:
- determining a source IP address; and
- using the source IP address to determine whether the first packet is the duplicate packet.

15. The system of claim 10, wherein the integrated circuit is further configured for:
- determining a fragment offset that is associated with the first packet; and
- using the fragment offset to determine whether the first packet is the duplicate packet.

16. The system of claim 10, wherein the integrated circuit is further configured for determining an amount of workload in an appliance, and wherein the integrated circuit is configured to determine whether the first packet is the duplicate packet when the amount of workload is below a prescribed threshold.

17. The system of claim 10, wherein the prescribed time period is 100 milliseconds or less.

18. The system of claim 10, wherein the header of the first packet comprises a L3 IPv4 or L3 IPv6 header.

19. A computer program product having a non-transitory medium storing a set of instructions, an execution of which causes a method of packet processing to be performed, the method comprising:
- receiving a first packet that includes a header, the header having a plurality of fields; and
- determining whether the first packet is a duplicate packet using a first one of the plurality of fields according to a pre-determined field-checking hierarchy;
- wherein the pre-determined field-checking hierarchy prescribes the first one of the plurality of fields to be checked before a second one of the plurality of fields, the first one of the plurality of fields having a higher change rate statistically than the second one of the plurality of fields; and
- wherein the first packet is determined to be the duplicate packet when the first one of the plurality of fields matches a respective one of fields in a second packet that is received before the first packet, and when the first packet is received within a prescribed time period since the second packet is received.

20. A method of packet processing, comprising:
- receiving a first packet that includes a header, the header having a plurality of fields, one of the plurality of fields being an identification field;
- determining an identification value for the identification field in the header of the first packet;
- determining whether the identification value of the first packet matches an identification value in a header of a second packet; and
- using an other one of the fields in the header of the first packet to determine whether the first packet is a duplicate packet when the identification value of the first packet matches the identification value of the second packet;
- wherein the act of using the another one of the fields comprises: after the act of determining the identification value for the identification field in the header of the first packet, and after the act of determining whether the identification value of the first packet matches the identification value of the second packet, determining whether a first N bits in the header of the first packet match a first N bits in the header of the second packet, N being a value greater than zero.

21. The method of claim 20, further comprising:
- after the act of determining whether the first N bits in the header of the first packet matches the first N bits in the header of the second packet, determining whether a destination IP address in the header of the first packet matches a destination IP address in the header of the second packet.

22. The method of claim 21, further comprising checking whether a fragment offset of the first packet matches a fragment offset of the second packet.

23. The method of claim 20, further comprising:
- after the act of determining whether the first N bits in the header of the first packet matches the first N bits in the header of the second packet, determining whether a source IP address in the header of the first packet matches a source IP address in the header of the second packet.

24. The method of claim 23, further comprising checking whether a fragment offset of the first packet matches a fragment offset of the second packet.

25. The method of claim 20, wherein the act of determining whether the identification value of the first packet matches the identification value of the second packet comprises using a hashing function.

26. The method of claim 20, further comprising determining an amount of workload in an appliance, wherein the acts of determining are performed when the amount of workload is below a prescribed threshold.

27. The method of claim 20, further comprising checking an additional one or more of the fields before the act of determining the identification value for the identification field in the header of the first packet, and the act of determining whether the identification value of the first packet matches the identification value in the header of the second packet.

28. The method of claim 20, wherein the first packet is received after the second packet is received, and is determined to be the duplicate packet
when the identification value of the first packet matches the identification value of the second packet,
when the other one of the plurality of fields in the header of the first packet matches a corresponding field in the plurality of fields in the header of the second packet, and
when the first packet is received within a prescribed time period since the second packet is received.

29. The method of claim 28, wherein the prescribed time period is 100 milliseconds or less.

30. A packet switch system, comprising:
a first port configured for receiving a first packet that includes a header, the header having a plurality of fields, one of the plurality of fields being an identification field; and
an integrated circuit configured for:
determining an identification value for the identification field in the header of the first packet;
determining whether the identification value of the first packet matches an identification value in a header of a second packet; and
using an other one of the fields to determine whether the first packet is a duplicate packet when the identification value of the first packet matches the identification value of the second packet;
wherein the integrated circuit is configured to use the another one of the fields by: after the act of determining the identification value for the identification field in the header of the first packet, and after the act of determining whether the identification value of the first packet matches the identification value of the second packet, determining whether a first N bits in the header of the first packet match a first N bits in the header of the second packet, N being a value greater than zero.

31. The system of claim 30, wherein the integrated circuit is further configured for:
after the act of determining whether the first N bits in the header of the first packet matches the first N bits in the header of the second packet, determining whether a destination IP address in the header of the first packet matches a destination IP address in the header of the second packet.

32. The system of claim 31, wherein the integrated circuit is further configured for checking whether a fragment offset of the first packet matches a fragment offset of the second packet.

33. The system of claim 30, wherein the integrated circuit is further configured for:
after the act of determining whether the first N bits in the header of the first packet matches the first N bits in the header of the second packet, determining whether a source IP address in the header of the first packet matches a source IP address in the header of the second packet.

34. The system of claim 33, wherein the integrated circuit is further configured for checking whether a fragment offset of the first packet matches a fragment offset of the second packet.

35. The system of claim 30, wherein the integrated circuit is configured for determining whether the identification value of the first packet matches the identification value of the second packet by using a hashing function.

36. The system of claim 30, wherein the integrated circuit is further configured for determining an amount of workload in an appliance, wherein the integrated circuit is configured to perform the acts of determining when the amount of workload is below a prescribed threshold.

37. The system of claim 30, wherein the integrated circuit is further configured to check additional one or more of the fields before performing the acts of determining.

38. The system of claim 30, wherein integrated circuit is configured to determine the first packet as the duplicate packet
when the identification value of the first packet matches the identification value of the second packet,
when the other one of the plurality of fields in the header of the first packet matches a corresponding one of fields in the header of the second packet, and
when the first packet is received within a prescribed time period since the second packet is received.

39. The system of claim 38, wherein the prescribed time period is 100 millisecond or less.

40. A computer program product having a non-transitory medium storing a set of instructions, an execution of which causes a method of packet processing to be performed, the method comprising:
receiving a first packet that includes a header, the header having a plurality of fields, one of the plurality of fields being an identification field;
determining an identification value for the identification field in the header of the first packet;
determining whether the identification value of the first packet matches an identification value in a header of a second packet; and
using another one of the fields to determine whether the first packet is a duplicate packet when the identification value of the first packet matches the identification value of the second packet;
wherein the act of using the another one of the fields comprises: after the act of determining the identification value for the identification field in the header of the first packet, and after the act of determining whether the identification value of the first packet matches the identification value of the second packet, determining whether a first N bits in the header of the first packet match a first N bits in the header of the second packet, N being a value greater than zero.

* * * * *